(No Model.)

H. W. CRANE.
BORING MACHINE.

No. 513,088. Patented Jan. 23, 1894.

WITNESSES:
Anna V. Faust
K. G. Frietsch

INVENTOR
Henry W. Crane
BY
Benedict Morsell
ATTORNEYS

UNITED STATES PATENT OFFICE.

HENRY W. CRANE, OF MILWAUKEE, WISCONSIN.

BORING-MACHINE.

SPECIFICATION forming part of Letters Patent No. 513,088, dated January 23, 1894.

Application filed July 27, 1893. Serial No. 481,586. (No model.)

*To all whom it may concern:*

Be it known that I, HENRY W. CRANE, of Milwaukee, in the county of Milwaukee and State of Wisconsin, have invented a new and useful Improvement in Boring-Machines, of which the following is a description, reference being had to the accompanying drawings, which are a part of this specification.

The object of my invention is to provide a device, to be operated by hand, adapted to bore a number of holes at the same time, and particularly to bore the holes in the edge of a door for the mortise for a lock.

The invention consists of the device, and its parts, as herein described and claimed, or their equivalents.

Figure 3:
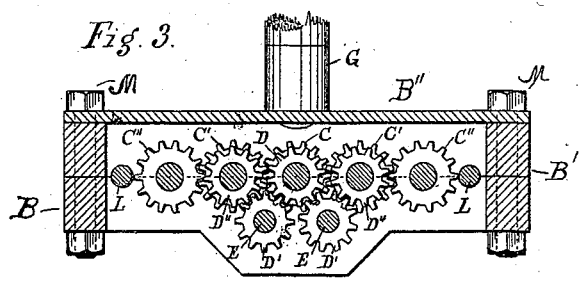
Figure 1:
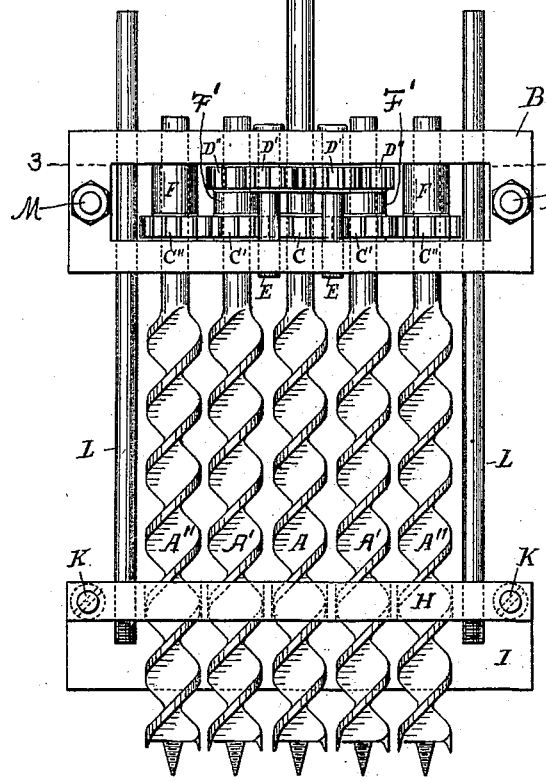
Figure 2:
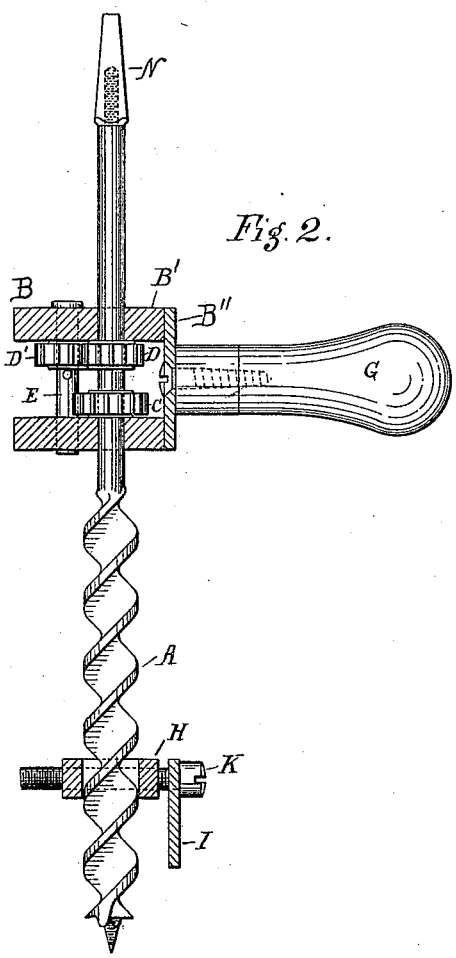

In the drawings, Figure 1, is a front elevation of the complete device. Fig. 2, is a transverse vertical section about centrally of Fig. 1. Fig. 3, is a horizontal section on line 3—3 of Fig. 1, looking downwardly.

The frame for supporting the augers A A' A'' and the other operative parts of the mechanism, consists of the elongated recessed parts B and B' and the back plate B''. The parts are secured detachably to each other by the transverse bolts M.

The shanks of the augers A, of which there are five in the device shown in the drawings, have their bearings in the frame, the augers being arranged parallel to and alongside of each other in the same plane. The central auger is provided with an elongated shank terminating in a truncated pyramidal stock or tang N which is preferably secured detachably to the shank of the auger by turning on the screw threaded contracted terminal portion thereof. This tang N is adapted to receive thereon and engage a brace of the ordinary form in common use, for rotating the auger and the other augers of the series.

For driving the augers A' and A'' from the central driven auger A, two trains of gears are employed, so as preferably to rotate all the augers in the same direction.

For rotating the augers A' adjacent on either side to the central auger A, a cog wheel D rigid on the shank of the auger A meshes with the two wheels D' loose on the posts E fixed in the frame, which wheels D' in turn mesh with the wheels D'' fixed respectively on the shanks of the augers A'. By this train of wheels the augers A' are driven from the auger A.

For driving the augers A'' a toothed wheel C fixed on the shank of the auger A meshes with wheels C' loose on the shanks of the augers A', which wheels C' in turn mesh with the wheels C'' fixed on the shanks of the augers A''. These wheels are all arranged in the recess of the frame, and the augers and the loose wheels are retained in place against endwise movement, by the bearing of the wheels against the sides of the frame and by means of sleeves F' F' interposed between the wheels and the frame and between the loose wheels and wheels fixed on the shanks.

A handle G secured rigidly to the plate B'' projects therefrom laterally at the rear of the device, and is adapted to be taken hold of by the operator for steadying the apparatus when in use, and for carrying it from place to place.

A straight guide bar H is provided with a series of apertures through which the twisted blades of the augers pass loosely. This bar is preferably constructed of some soft metal or composition, so that if the lips or cutting edges of the augers come in contact therewith they will not be appreciably dulled thereby. This bar is provided with guide rods L extending therefrom alongside of the augers and preferably in a plane therewith, which rods pass loosely through the frame, in such manner that the bar H moves readily toward and from the frame. The rods L are conveniently secured to the bar H by turning therethrough by screw thread and preferably project equally a little distance beyond the lower surface of the bar H. This bar is especially adapted for keeping the augers true, and not permitting them to spring or bend or in any other way to diverge from each other, when in use. A guide plate I at the rear of the guide bar H is secured thereto adjustably by screws K. When used the guide plate I is set at such distance from the bar H, and consequently from the augers, as adapts it to be used as a gage for placing the augers on the edge of the door to be mortised, at the desired distance from its surface. For this purpose the bar H is let down before boring is commenced so that the lower extremities of the rods L will rest on the edge of the door, the plate I being placed against its surface, and as the boring proceeds the bar and plate will be carried toward the frame while still serving as a guide for the augers, and for holding the device in position relative to the door.

What I claim as my invention, and desire to secure by Letters Patent, is—

In a boring machine, the combination, of a frame, a plurality of augers mounted revolubly in the frame, means for driving one of the augers, gear wheels mounted fixedly on the driven auger, posts having gear wheels loose thereon, said gear wheels meshing with one of the fixed gears of the driven auger, gear wheels on the shanks of other of the augers, one of the gear wheels of each of said augers being fixed, and the other loose, the respective fixed wheels meshing with the loose gear wheels on the posts, and the respective loose wheels meshing with the other fixed wheel of the driven auger, and gear wheels fixed on other of the auger shanks, said last named gear wheels meshing with the loose gears of the augers adjacent which receive their motion from one of the fixed gears of the driven shaft, substantially as set forth.

In testimony whereof I affix my signature in presence of two witnesses.

HENRY W. CRANE.

Witnesses:
C. T. BENEDICT,
ANNA V. FAUST.